United States Patent [19]

Chaffee et al.

[11] Patent Number: 4,687,829
[45] Date of Patent: Aug. 18, 1987

[54] METHOD OF ADJUSTING PHYSICAL PROPERTIES IN SILICONE ELASTOMERIC SEALANT

[75] Inventors: Roger G. Chaffee; Leo F. Stebleton, both of Midland, Mich.

[73] Assignee: Dow Corning Corporation, Midland, Mich.

[21] Appl. No.: 835,579

[22] Filed: Mar. 3, 1986

[51] Int. Cl.$^4$ ............................................. C08G 77/06
[52] U.S. Cl. ........................................ 528/17; 528/33; 528/34; 528/35; 528/901; 524/859; 524/860
[58] Field of Search .................... 528/17, 33, 34, 35, 528/901; 524/859, 860

[56] References Cited

U.S. PATENT DOCUMENTS

| | | | |
|---|---|---|---|
| 3,122,522 | 2/1964 | Brown et al. | 260/46.5 |
| 3,175,993 | 3/1965 | Weyenberg | 260/46.5 |
| 3,334,067 | 8/1967 | Weyenberg | 260/46.5 |
| 3,383,355 | 5/1968 | Cooper | 260/46.5 |
| 3,542,901 | 11/1970 | Cooper et al. | 260/825 |
| 3,856,839 | 12/1974 | Smith et al. | 260/375 B |
| 4,100,129 | 7/1978 | Beers | 260/375 B |
| 4,143,088 | 3/1985 | Favre et al. | 260/825 |
| 4,599,394 | 7/1986 | Lucas | 528/31 |

FOREIGN PATENT DOCUMENTS 0110251 6/1984 European Pat. Off. .
123935 11/1984 European Pat. Off. .

Primary Examiner—Melvyn I. Marquis
Attorney, Agent, or Firm—Edward C. Elliott

[57] ABSTRACT

An improved silicone elastomeric sealant composition is produced by mixing alkoxy functional polydiorganosiloxane having alkoxysilethylene ends with a combination of trifunctional or tetrafunctional silane crosslinker and defunctional silane chain extender. The sealant composition is stable upon storage in the absence of moisture, but cures to an elastomer upon exposure to moisture. The cured composition can be adjusted for the desired elongation by varying the ratio of crosslinker to chain extender, but there must be at least 50 mol percent of crosslinker in the composition to ensure that the composition cures to a non-tacky surface.

16 Claims, No Drawings

METHOD OF ADJUSTING PHYSICAL PROPERTIES IN SILICONE ELASTOMERIC SEALANT

BACKGROUND OF THE INVENTION

1. Field of the Invention

This invention relates to a method of adjusting the physical properties of a one-part silicone elastomeric sealant which is stable in the absence of moisture but cures when exposed to moisture.

2. Background Information

The sealant produced by the method of this invention has a special polymer present which aids in giving the uncured sealant a particularly long shelf life. U.S. Pat. No. 3,122,522, issued Feb. 25, 1964 to Brown and Hyde discloses a siloxane composition, each molecule of which consists essentially of (1) at least two units of the formula $$[R'(OCH_2CH_2)_cO]_a(R_b)SiZ(R_2)SiO_{0.5}$$

and units of the formula $$R_dSiO_{(4-d)/2}$$

where each a has a value ranging from 2 to 3, each b has a value ranging from 0 to 1, the sum of a and b in any unit (1) is no greater than 3, each c has a value ranging from 1 to 2, each d has a value ranging from 0 to 2, and Z is a divalent hydrocarbon radical of from 2 to 18 inclusive carbon atoms, Z being free of aliphatic unsaturation. Each molecule of the silicone composition has an average of from 1.3 to 2 R groups per silicon atom and there are at least 7 units of $R_dSiO_{(4-d)/2}$ per molecule.

U.S. Pat. No. 3,175,993, issued Mar. 30, 1965 to Weyenberg discloses a composition consisting essentially of the average formula $$\underset{|}{\overset{R_y}{Si}}\{(OSi)_x Z \underset{|}{\overset{R_2}{Si}}(OR')_a\}_{4-y}^{R_{3-a}}$$

in which each R is free of aliphatic unsaturation, Z is a divalent hydrocarbon radical free of aliphatic unsaturation, y has a value of from 0 to 2 inclusive, x has a value of at least 3 and a has an average value from 2 to 3 inclusive.

Both of the above references teach preparation of the siloxane by reacting siloxanes containing -SiH groups with the appropriate silane containing a monovalent hydrocarbon radical containing an aliphatic or cycloaliphatic group in the presence of a platinum catalyst through the reaction of the —SiH and aliphatic C≡C group. This reaction produces the divalent Z radical. Alternatively, the C≡C group can be on the siloxane and the —SiH can be on the silane.

European Patent Application No. 0110251, published June 6, 1984, discloses a process for producing alkoxyterminated polysiloxanes useful to produce room temperature vulcanizing silicone rubber compositions. The process anhydrously reacts a silanol or vinyl siloxane with a polyalkoxy crosslinking agent which is an alkoxy silane in the presence of a platinum catalyst. This alkoxy-terminated polysiloxane can also be mixed with treated filler and condensation catalyst. This application teaches that an alkoxy-terminated polysiloxane having no silethylene linkage at the polymer terminal silicon is equivalent to a polydiorganosiloxane that does contain a trialkoxysilethylene terminal group.

European Patent Application No. 123 935 A , published Nov. 7, 1984 by Toten and Pines, discloses an alkoxysilyl functional silicone including at least one functional group of the formula $$(RO)_{3-a}\overset{(R')_x}{\underset{|}{Si}}(CH_2)_w\overset{|}{\underset{|}{Si}}-$$

where w is an integer of from 2 to about 20, useful as capable of imparting satisfactory lubricity and other properties such as softness to a variety of textile fabrics.

There are many patents directed to the system of producing silicone sealants based upon the use of alkoxy functional polymers, alkoxy functional crosslinkers, and titanate catalysts. Representative of these is U.S. Pat. No. 3,334,067, issued Aug. 1, 1967, to Weyenberg. Weyenberg discloses a method of making one component room temperature curing siloxane rubber. His compositions are stable in the absence of moisture, but cure upon exposure to moisture. The method comprises mixing in the absence of moisture a hydroxy endblocked siloxane polymer, a silane of the formula R'Si(OR")₃ and a beta-dicarbonyl titanium compound.

In U.S. Pat. No. 3,383,355, issued May 14, 1968, Cooper discloses polymers having alkoxy groups bonded to terminal silicon atoms by reacting a hydroxylated organosiloxane polymer with an alkoxy silane in the presence of a suitable catalyst. He discloses that such functional diorganopolysiloxanes having from two to three alkoxy radicals attached to each terminal silicon atom are curable in the presence of moisture and a suitable hydrolysis and condensation catalyst to a rubbery material.

Smith et al., in U.S. Pat. No. 3,856,839, issued Dec. 24, 1974, disclose alkanedioxy titanium chelates which catalyze the cure of a composition which also contains methyltrimethoxysilane and a silanol chain-stopped polydiorganosiloxane fluid. The particular chelated titanium compound is stated to be desirable because it does not cause thickening during the manufacture of the composition as does the previously known titanium compounds.

In U.S. Pat. No. 4,100,129, issued July 11, 1978, Beers discloses a self-bonding, low modulus, one-package room temperature vulcanizing silicone composition. In his description of his silane cross-linking agent, he includes silanes in which there are two functional groups. The presence of a chain extending agent results in a final cured product having a higher degree of elasticity.

U.S. Pat. No. 4,143,088, issued Mar. 6, 1985, to Favre et al., discloses use of alkoxylated organosilicon compounds consisting of either monomers or polymers having difunctional, trifunctional or tetrafunctional molecules, comprising at most 40 percent of difunctional monomers in an organosilicon composition which is storagestable in the absence of moisture and is rapidly curable into elastomers with self-adherent properties in the presence of water at room temperature.

SUMMARY OF THE INVENTION

In a silicone elastomeric sealant based upon an alkoxy endblocked polydiorganosiloxane which has an alkylene link between the end silicon atoms, it was found that the physical properties of the sealant could be controlled by using a mixture of trifunctional and difunctional silanes as crosslinkers and chain extenders, as long as the amount of chain extender was held below 50 mol percent of the total amount of silane. The sealant has a long storage life, providing it is stored in the absence of moisture.

It is an object of this invention to provide a method of controlling the physical properties, particularly elongation, of a silicone sealant based upon an alkoxy endblocked polydiorganosiloxane in which the end silicon atoms are separated by an alkylene linkage.

DESCRIPTION OF THE INVENTION

This invention relates to a method of adjusting the physical properties of a silicone elastomeric sealant, having alkoxy functional groups, which is stable in the absence of moisture and cures upon exposure to moisture comprising (A) mixing in the absence of moisture (1) 100 parts by weight of an alkoxy functional polydiorganosiloxane of the formula

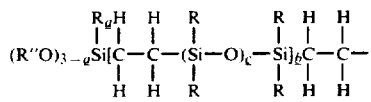

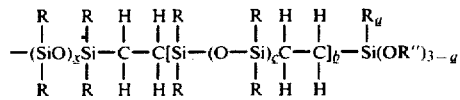

where R is methyl, ethyl, propyl, phenyl, or trifluoropropyl, R'' is methyl or ethyl, $a$ is 0 or 1, $b$ is 0 or 1, $c$ is from 1 to 6 and $x$ is such that the viscosity is from 1 to 1000 Pa.s at 25° C., (2) From 0 to 500 parts by weight of filler, (3) from 2 to 15 parts by weight of a crosslinker of the formula

R'$_a$Si(OR'')$_{4-a}$ where R' is methyl or phenyl, R'' is methyl or ethyl, and $a$ is 0 or 1, (4) from 1 to 15 parts by weight of a chain extender selected from the formula PhMeSi(OR'')$_2$, R''OSiMe$_2$OR'', and Ph(OSiMe$_3$)Si(OR'')$_2$, where Ph is phenyl, Me is methyl, and R'' is methyl or ethyl, and the mols of chain extender (4) are less than the mols of crosslinker (3), and (5) from 0.2 to 4.0 parts by weight of a titanium catalyst, and (B) storing the mixture in the absence of moisture.

The method of this invention was developed to produce silicone elastomeric sealants having a long shelf life and a high elongation. A silicone sealant based upon alkoxy functional polydiorganosiloxanes having trialkoxysilethylene ends or dialkoxy(alkyl)silethylene ends was found to have elongations that were lower than desired. Work upon this problem resulted in the discovery of the method of this invention in which the elongation could be increased while maintaining other desired properties, including the ability to cure upon exposure to moisture to a dry, non-tacky surface.

The polydiorganosiloxane which is used in this invention is a particular one of the formula

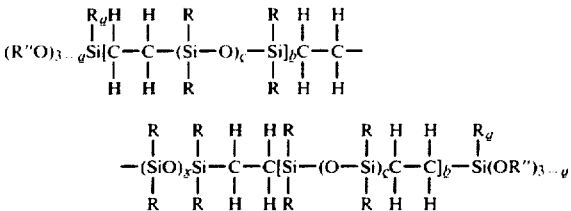

where R is methyl, ethyl, propyl, phenyl, or trifluoropropyl, R'' is methyl or ethyl, $a$ is 0 or 1, $b$ is 0 or 1, $c$ is from 1 to 6 and $x$ is such that the viscosity is from 1 to 1000 Pa.s at 25° C. This alkoxysilethylene ended polymer has been found to provide outstanding shelf life when it is used to make silicone sealants using a titalium catalyst.

A preferred polymer, obtained when $b$ is 0, is of the formula

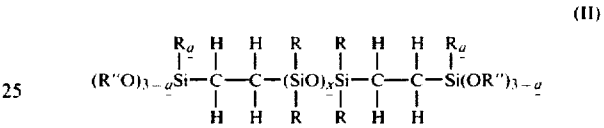

(II)

or, when $b$ is 1 and $c$ is 1, is of the formula

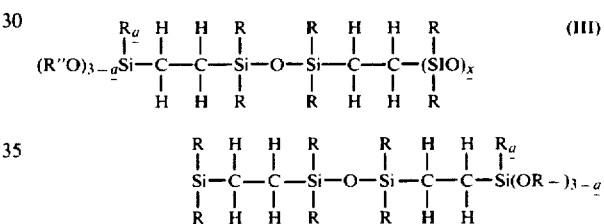

(III)

where R and R'' are as described above. Methyl radical is preferred for R and R''. The radicals can be the same or combinations of the above where at least 50 mol percent of the radicals are methyl radicals.

The polymer of the formula (II) may be produced by reacting a hydrogen endblocked siloxane with a silane of the formula

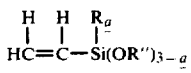

in the presence of a platinum catalyst such as chloroplatinic acid at a temperature of from 30° to 150° C. Methods of making these polymers are taught in U.S. Pat. No. 3,175,993, issued Mar. 30, 1965, to Weyenberg, which is hereby incorporated by reference to show methods of manufacturing polymer of formula (II).

The polymer of formula (III) is manufactured by reacting a vinyl endblocked polydiorganosiloxane with an endcapping composition of the formula

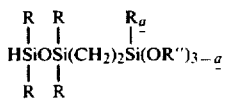

where R and R'' are as defined above, using a platinum catalyst to cause the materials to react. This endcapping composition is prepared by reacting $ViR_aSi(OR'')_{3-a}$ with $(R_2HSi)_2O$ in the presence of a platinum catalyst where only one end of the disilane is reacted. This can be done by combining 1 mol of the $ViR_aSi(OR'')_{3-a}$ with greater than 2 mols of the disilane. When this mixture is combined with a platinum catalyst, there is a slightly exothermic reaction after a few minutes at room temperature. The color changes from clear to light yellow. A byproduct will be present consisting of product produced by the reaction of $ViSi(OMe)_3$ to both ends of the silane. This byproduct can be left in the material. At a 1 to 2 ratio, there is about 15 percent byproduct produced. If the ratio is changed to 1 to 4 the byproduct drops to about 5 percent. The excess silane is then stripped from the product.

Useful silicone elastomeric sealants are commonly produced with a filler as one of the ingredients. These fillers are well known in the industry. They are added to the mixture to provide reinforcement of the polymer, to provide control of the flow characteristics of the sealant before curing, to control the physical properties of the sealant after curing, and to extend the bulk of the sealant to reduce the cost of the ingredients, as well as to provide other desired characteristics such as opacity. Reinforcing fillers such as fume silila, precipitated silica, and diatomacious earth are used to give the highest physical strengths to the sealants. Reinforcing fillers are generally recognized as being very fine particles having a surface area from about 50 to 700 $m_2/g$. These fillers may be used with untreated filler surfaces or with treated filler surfaces, the treatment being used to modify the filler surface so that it properly reacts with the polymer and the other ingredients in the sealant. Extending fillers such as titanium dioxide, zirconium silicate, calcium carbonate, iron oxide, ground quartz, and carbon black are commonly used. The amounts of filler used can obviously be varied within wide limits in accordance with the intended use. For example, in some cases the sealant could be used with no filler, but it would have very low physical properties. Reinforcing fillers are commonly used in amounts from about 5 to 50 parts by weight to give the highest physical properties, such as tensile strength. Extending fillers are finely ground in that the average particle size is in the range of from about 1 to 10 micrometers. Extending fillers are used in amounts as high as 500 parts by weight per 100 parts by weight of polymer in some cases.

The sealant is cured through the use of a crosslinker (3) of the formula $R'_aSi(OR'')_{4-a}$ where $R'$ is methyl or phenyl, $R''$ is methyl or ethyl, and a is 0 or 1. These alkoxy silanes and their method of manufacture are well known. Preferred are the silanes in which there are three alkoxy groups present, such as methyltrimethoxysilane. The amount of crosslinker preferably is from 2 to 15 parts, with from 2 to 8 parts most preferred. It is possible to produce useful sealants without using a crosslinker when the polymer of this invention is present because of the functionality of the polymer itself, but from a practical viewpoint, the crosslinker is useful in that it contributes to the excellent shelf life of the sealant. It is also useful in controlling the degree of crosslinking in the cured elastomeric sealant, more of the crosslinker results in a harder, lower elongation elastomer.

The sealants of this invention can be increased in elongation through the use of a chain extender (4). Preferred chain extenders are selected from those of the formula $MePhSi(OR'')_2$, $R''OSiMe_2OR''$, and $Ph(OSiMe_3)Si(OR'')_2$, where Ph is phenyl, Me is methyl, and $R''$ is methyl or ethyl. $R''$ is preferably methyl radical. These dialkoxy silanes and their method of manufacture are well known. The amount of chain extender 1 to 15 parts by weight with an amount of from 1 to 4 parts by weight most preferred. The higher amounts of chain extender result in a softer, higher elongation elastomer. It has been discovered that it is necessary that the moles of chain extender (4) are less than the mols of crosslinker (3) in order to get a dry, well cured surface on the sealant when it is cured.

The sealants of this invention are cured through the use of a titanium catalyst(5). The titanium catalyst can be any of those known to be useful in catalyzing the moisture induced reaction of alkoxy containing siloxanes or silanes. Preferred are a titanium catalyst such as titanium naphthenate, titanium esters such as tetrabutyltitanate, tetra-2-ethylhexyltitanate, tetraphenyltitanate, triethanolaminetitanate, organosiloxytitanium compounds such as those described in U.S. Pat. No. 3,294,739, and beta-dicarbonyl titanium compounds such as those described in U.S. Pat. No. 3,334,067, both patents being herein incorporated by reference to show titanium catalyst and methods of manufacture. Preferred catalysts include tetrabutyltitanate, tetraisopropyltitanate, and bis-(acetylacetonyl)-diisopropyltitanate. The amount of catalyst is preferably from 0.2 to 4.0 parts by weight per 100 parts by weight of polydiorganosiloxane (1). As more catalyst is used, the cure rate is accelerated.

The method of this invention is used to produce an improved silicone elastomeric sealant. The preferred method mixes the alkoxysilethylene ended polymer (1) with any filler until a uniform mixture is obtained. Mixing can be with a low shear mixer or strirrer in the case of the extending fillers or with a high shear mixer such as a dough mixer or 3-roll mill in the case of the reinforcing fillers. After the polymer and filler are mixed, it is desirable to place them in a container and centrifuge them to remove any entrapped air and its accompanying moisture. Then the desired mixture of crosslinker (3), chain extender (4), and titanium catalyst (5) are added in the absence of exposure to moisture. They are thoroughly stirred to give a uniform mixture. The uniform mixture is then preferably deaired, aged 24 hours and again deaired by exposing the mixture to a vacuum to remove any volatiles or moisture from the mixture. The mixture is then sealed into storage containers, sealant tubes for example, to store it until it is to be used.

The composition produced by the method of this invention has an improved shelf life when compared to mixtures made with conventional alkoxy functional polydiorganosiloxanes which do not contain the silethylene group at the ends of the polymer. The elongation of the cured composition is adjusted by varying the ratio of the crosslinker (3) and the chain extender (4), the more of (4) that is used, the higher the elongation. It is necessary that at least 50 mol percent of the mixture of crosslinker (3) and chain extender (4) be crosslinker to insure that the composition will cure to a non-tacky surface when exposed to moisture.

When the composition produced by the method of this invention is exposed to moisture, it cures to give an elastomeric silicone. The composition is useful as a sealant material for filling spaces and gaps as in sealing buildings.

The following examples are included for illustrative purposes only and should not be construed as limiting the invention, which is properly set forth in the appended claims. All parts are parts by weight.

EXAMPLE 1

A quantity of trimethoxysilylethylene endblocked polymer was prepared by mixing together 100 parts of dimethylvinylsiloxy endblocked polydimethylsiloxane having a viscosity of about 10 Pa.s at 25° C., 2.05 parts of endblocker of the formula

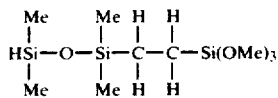

where Me is methyl, and 0.031 parts of chloroplatinic acid complex of divinyltetramethyldisiloxane diluted with dimethylvinylsiloxy endblocked polydimethylsiloxane to provide 0.7 weight percent platinum. The mixture was allowed to react with mixing for 2.5 hours at room temperature, then was placed into a storage container until needed for use. This trimethoxysilylethylene endblocked polydimethylsiloxane had a viscosity of about 12.5 Pa.s at 25° C. and a formula

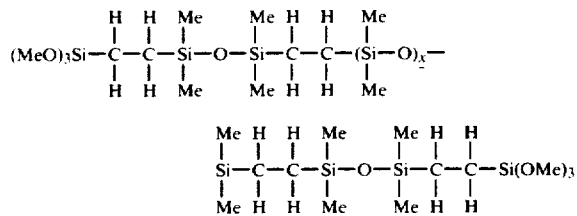

where x is the required value to give the specified viscosity.

A series of bases were prepared using the above polymer. Base A was a mixture of 200 g of the above polymer with 200 g of a finely ground calcium carbonate filler. The polymer and filler were mixed together with a spatula, then passed three times through a 3-roll mill to thoroughly disperse the filler in the polymer. The base was then placed in sealant tubes and centrifuged for 4 minutes to remove all air and the tube was sealed.

Base B was a mixture of 300 g of the above polymer, 300 g of ground quartz having an average particle size of about 10 micrometers, and 12 g of hydroxyl endblocked polymethylphenylsiloxane having a viscosity of about 0.5 Pa.s at 25° C. and about 4.5 weight percent silicon-bonded hydroxyl radicals. This was mixed and stored as with base A.

Base C was a mixture of 400 g of the above polymer, 28 g of fume silica having a surface area of about 150 m2/g, 100 g of diatomaceous earth filler, and 12 g of the hydroxyl endblocked polymethylphenylsiloxane fluid used in base B. This was mixed and stored as with base A.

Base D was a mixture of 200 g of the above polymer, 7 g of the above hydroxyl endblocked polymethylphenylsiloxane fluid, 100 g of ground quartz having an average particle size of about 5 micrometers, and 150 g of a treated calcium carbonate. This was mixed and stored as in base A.

Samples of each of the above bases in an amount sufficient to give 100 parts of the polymer were then mixed with the parts of methyltrimethoxysilane crosslinker and parts of phenyl(trimethylsiloxy)dimethoxysilane chain extender shown in Table 1, and 2 parts of 2,5-di-isopropoxy-bis-ethylacetoacetate titanium catalyst by addition through a syringe and mixing without exposing to air. The catalyzed mixture was centrifuged to remove all air and stored overnight. Then the container was opened and devolatilized for 4 hours in a vacuum chamber, then resealed and again centrifuged. Each sample was stored for 6 days at room conditions.

Each sealant sample was tested, after storage, by extruding the sealant from the tube into a chase and spreading the sealant out to form a sheet about 3 mm thick and allowing the sealant to cure for 7 days as 23° C. and 50 percent relative humidity. The properties were measured in accordance with ASTM D 2240 for durometer, ASTM D 412 for tensile strength and elongation and ASTM D 624 for tear strength. The results of the testing are shown in Table 1.

TABLE I

| Sample | Base | Crosslinker parts | Crosslinker mols | Chain Extender parts | Chain Extender mols |
|---|---|---|---|---|---|
| 1 | A | 4.0 | 0.0294 | — | |
| 2 | A | 2.0 | 0.0147 | 3.8 | 0.0147 |
| 3 | B | 4.0 | 0.0294 | — | |
| 4 | B | 3.0 | 0.0221 | 1.9 | 0.0074 |
| 5 | B | 2.0 | 0.0147 | 3.8 | 0.0147 |
| 6 | C | 4.0 | 0.0294 | — | |
| 7 | C | 3.0 | 0.0221 | 1.9 | 0.0074 |
| 8 | C | — | | 5.6 | 0.0219 |
| 9 | D | 4.0 | 0.0294 | — | |
| 10 | D | 2.0 | 0.0147 | 3.8 | 0.0147 |

| Sample | Durometer | Tensile Strength MPa | Elongation percent | Tear Strength kN/m |
|---|---|---|---|---|
| 1 | 43 | 2.23 | 190 | 2.8 |
| 2 | 34 | 1.80 | 375 | 2.9 |
| 3 | 56 | 4.07 | 168 | 3.2 |
| 4 | 39 | 3.89 | 234 | 3.2 |
| 5 | 36 | 3.35 | 344 | 3.5 |
| 6 | 44 | 4.71 | 204 | 5.2 |
| 7 | 46 | 4.93 | 222 | 5.1 |
| 8 | 20 | 1.89 | 534 | 8.2 |
| 9 | 48 | 2.44 | 206 | 3.3 |
| 10 | 37 | 2.41 | 430 | 4.0 |

In each of the bases, substituting the chain extender for part of the crosslinking agent resulted in a sealant having a higher elongation. Sample 8, having all the crosslinker replaced by chain extender, shows that the durometer and tensile strength are reduced to a great degree while the elongation and tear strength go up upon substitution of chain extender for crosslinking agent.

EXAMPLE 2

A series of samples were prepared to compare the use of different chain extenders.

A base was prepared by mixing 100 parts of the polymer of Example 1 and 100 parts of ground quartz having an average surface area of about 5 micrometers in the same manner as in Example 1. The base was then stored and catalyzed in the same manner as in Example 1, using 2 parts of the titanium catalyst and using the parts of methyltrimethoxysilane crosslinker and chain extender shown in Table 2, again based upon 100 parts of polymer. The catalyzed compositions were then stored and tested as in Example 1 with the results shown in Table 2.

TABLE 2

| Sample | Crosslinker parts | Crosslinker mols | Ph(OSiMe₃)Si(OMe)₂ parts | Ph(OSiMe₃)Si(OMe)₂ mols | Me₂Si(OMe)₂ parts | Me₂Si(OMe)₂ mols | Durometer | Tensile Strength MPa | Elongation percent | Tear Strength kN/m |
|---|---|---|---|---|---|---|---|---|---|---|
| 1 | 4.0 | 0.0294 | — | — | — | — | 50 | 4.8 | 161 | 2.8 |
| 2 | 3.0 | 0.0221 | 1.88 | 0.0073 | — | — | 47 | 5.3 | 204 | 2.7 |
| 3 | 3.0 | 0.0221 | — | — | 1.13 | 0.0094 | 46 | 5.7 | 186 | 2.6 |

EXAMPLE 3

A series was prepared to illustrate the amount of chain extender that could be used successfully.

A base was prepared, stored, and catalyzed in the same manner as in Example 2, using the amount of Ph(OSiMe)Si(OMe)₂ shown in Table 3. The catalyzed compositions were then stored and tested as in Example 1 with the results shown in Table 3.

TABLE 3

| Sample | Crosslinker parts | Crosslinker mols | Chain Extender parts | Chain Extender mols |
|---|---|---|---|---|
| 1 | 4.0 | 0.0294 | — | — |
| 2 | 3.0 | 0.0221 | 2.82 | 0.0110 |
| 3 | 2.5 | 0.0184 | 4.23 | 0.0165 |
| 4 | 2.0 | 0.0147 | 5.64 | 0.0220 |
| 5 | 1.5 | 0.0110 | 6.05 | 0.0236 |
| 6 | 1.0 | 0.0074 | 8.46 | 0.0330 |

In each sample, the methoxy concentration is the same

| Sample | Durometer | Tensile Strength MPa | Elongation percent | Tear Strength kN/m |
|---|---|---|---|---|
| 1 | 48 | 5.40 | 160 | 3.0 |
| 2 | 41 | 5.42 | 217 | 4.0 |
| 3 | 35 | 5.44 | 283 | 3.5 |
| 4* | 32 | 4.57 | 338 | 3.3 |
| 5* | 26 | 3.82 | 440 | 3.2 |
| 6* | 11 | 1.96 | 595 | 3.2 |

*samples tacky at surface after 24 hour cure

When the mols of chain extender exceed the mols of crosslinker used, the material still cures to give useful properties, but the surface remains tacky, a condition which is usually not satisfactory.

That which is claimed is:

1. A method of adjusting the physical properties of a silicone elastomeric sealant, having alkoxy functional groups, which is stable in the absence of moisture and cures upon exposure to moisture comprising (A) mixing in the absence of moisture (1) 100 parts by weight of an alkoxy functional polydiorganosiloxane of the formula

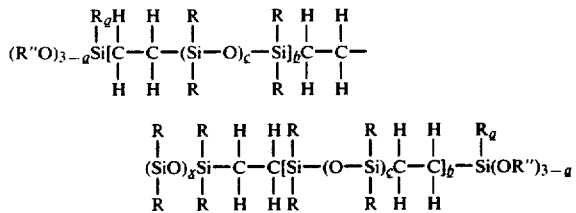

where R is methyl, ethyl, propyl, phenyl, or trifluoropropyl, R" is methyl or ethyl, a is 0 or 1, b is 0 or 1, c is from 1 to 6 and x is such that the viscosity is from 1 to 1000 Pa.s at 25° C., (2) From 0 to 500 parts by weight of a filler, (3) from 2 to 15 parts by weight of a crosslinker of the formula $$R'_a Si(OR'')_{4-a}$$

where R' is methyl or phenyl, R" is methyl or ethyl, and a is 0 or 1, (4) from 1 to 15 parts by weight of a chain extender selected from the formula PhMeSi(OR")₂, R"OSiMe₂OR", and Ph(OSiMe₃)Si(OR")₂, where Ph is phenyl, Me is methyl, and R" is methyl or ethyl, and the mols of chain extender (4) are less than the mols of crosslinker (3), and (5) from 0.2 to 4.0 parts by weight of a titanium catalyst, and (B) storing the mixture in the absence of moisture.

2. The method of claim 1 in which b is 1.

3. The method of claim 2 in which c is 1.

4. The method of claim 1 in which the crosslinker (3) is trifunctional.

5. The method of claim 1 in which the chain extender (4) is phenyl(trimethylsiloxy)dimethoxysilane.

6. The method of claim 1 in which the chain extender (4) is dimethyldimethoxysilane.

7. The method of claim 2 in which the crosslinker (3) is present in an amount of from 2 to 8 parts by weight and is methyltrimethoxysilane and chain extender (4) is present in an amount of from 1 to 4 parts by weight and is phenyl(trimethylsiloxy)dimethoxysilane.

8. The method of claim 3 in which the crosslinker (3) is present in an amount of from 2 to 8 parts by weight and is methyltrimethoxysilane and chain extender (4) is present in an amount of from 1 to 4 parts by weight and is phenyl(trimethylsiloxy)dimethoxysilane.

9. The composition produced by the method of claim 1.

10. The composition produced by the method of claim 2.

11. The composition produced by the method of claim 3.

12. The composition produced by the method of claim 4.

13. The composition produced by the method of claim 5.

14. The composition produced by the method of claim 6.

15. The composition produced by the method of claim 7.

16. The composition produced by the method of claim 8.

* * * * *

UNITED STATES PATENT AND TRADEMARK OFFICE
CERTIFICATE OF CORRECTION

PATENT NO. : 4,687,829

DATED : August 18, 1987

INVENTOR(S) : Roger George Chaffee and Leo Frederick Stebleton

It is certified that error appears in the above-identified patent and that said Letters Patent is hereby corrected as shown below:

Column 4, line 18, remove "titalium" and replace with ---titanium---.

Column 6, line 4, after "The amount of chain extender", add ---preferably is from---.

In the Abstract, line 5, remove "defunctional" and replace with ---difunctional---.

Signed and Sealed this

Fourteenth Day of June, 1988

Attest:

DONALD J. QUIGG

*Attesting Officer*          *Commissioner of Patents and Trademarks*